Patented Jan. 16, 1945

2,367,519

UNITED STATES PATENT OFFICE 2,367,519

CONDITIONING PHTHALOCYANINE DYE-STUFFS TO PIGMENTARY FORM

Grady M. O'Neal, Chicago, Ill., assignor to The Sherwin-Williams Company, Cleveland, Ohio, a corporation of Ohio No Drawing. Application March 1, 1941,
Serial No. 381,396

9 Claims. (Cl. 260—314.5)

The present invention relates generally to pigment dyestuffs, and in particular to pigments of the phthalocyanine dyestuff type.

The use of many dyestuffs as pigments is well known. However, not all dyestuff forms are commonly suitable for pigment usage. This obtains because a number of dyestuffs, when in the final crude condition, possess extremely poor tinctorial properties as a result of their unfavorable physical characteristics. This unfavorable physical condition is due to a coarseness or agglomeration of the dyestuff particles, which in turn is responsible for the pigmentary properties, such as brightness of hue, color strength, and masstone characteristics, being highly undesirable or unsuited for uses in printing, paint manufacture, or other practices. This unsuitability of physical state, experience has shown, cannot be sufficiently altered by a simple mechanical processing, such as subdivision by grinding, and bring out the known optimum pigment qualities.

The literature contains numerous examples of special processes, either in use or proposed, for the physical conditioning of particular dyestuff forms so as to improve their originally poor tinctorial properties. The processing of vat dyestuffs by the well known acid-pasting procedure is one general method. However, it is well known to those skilled in the arts that one method of physical conditioning may give satisfactory results when applied to one pigment dyestuff, yet when applied to a dyestuff of different constitution or type prove to be of little, if any value. Further, the procedural details of the process employed for the physical conditioning of a specific dyestuff often determines the degree of obtained improvement, or whether or not the dyestuff is of value as a pigment.

The phthalocyanine dyestuffs have been the subject of considerable work along the lines of improving the pigmentary properties. Numerous patents and published work cover a variety of procedural methods. Typical of these are the teachings of the U. S. Patent No. 2,192,704 to Dahlen et al., and the British Patent No. 503,666.

According to the basic procedure of U. S. No. 2,192,704, the dyestuff is dissolved in strong sulfuric acid at 0° C. to +5° C. and then added to water at the near boil to precipitate the dye in a pigment form. It is then filtered, reslurried in an alkaline medium, washed, and then dried.

According to the British patent the dyestuff, as a 50% aqueous paste, is dissolved at a temperature not in excess of 45° C. in 78% sulfuric acid. The mass is then diluted, after cooling, with enough water to form a 65% sulfuric acid. After stirring to the formation of a viscous green-colored mass, it is poured into excess water to precipitate the dyestuff, then filtered, washed, and dried.

The value of a pigment dyestuff form over the corresponding crude dyestuff form lies in the excellent pigmenting effects of the former over the almost non-existent, but desired, effects of the latter. The properties of brightness, hue, color strength, and masstone characteristics are important in pigment dyestuffs, and are generally covered by the broad term, tinctorial properties. These must be such that the pigment form is valuable in paints, lacquers, enamels, printing inks, plastics, and the like.

The prior art processes when applied to phthalocyanine dyestuffs, have a number of serious objections. In general, their shortcomings seem to fall into two categories: The procedural details are often tedious and involved; or the processes fail to secure the known optimum tinctorial properties. It has now been discovered that it is possible and feasible to condition phthalocyanine dyestuffs by a process that is simple and easy to perform. The products obtained by this novel process are of excellent quality, tinctorially, and eminently suited for employment in pigment usage. It is not claimed that the present invention produces the optimum result, but it shows improvement over the prior art in a direction to improve the tinctorial properties.

One of the objectives of the process of Patent No. 2,192,704 was the elimination of the lightening and "chalkiness" in masstone, produced by those procedures calling for addition of acid solutions of the dyestuffs to boiling water, such process being essentially an adaptation of a basic and general method entirely satisfactory for Indanthrene Blue RS (see U. S. No. 2,065,928).

It is an object of the present invention to convert phthalocyanine dyestuffs to improved pigment forms by special controls of the general process comprising dissolving the dyestuff in strong sulfuric acid, and precipitating the dyestuff therefrom by addition to water.

A particular object of the invention is to precipitate the dyestuff at the lowest temperatures of the process, and then to heat the dyestuff in water at relatively much higher temperatures.

Still another object of the invention is to so effect said heating in the acid solution in which the precipitation occurs.

Still another object of the invention is to precipitate the dyestuff from its acid solution in the presence of a suitable wetting agent.

Various other and ancillary objects and advantages of the present invention will become apparent from the following description and explanation of the invention.

Generally, the process is akin to the prior art procedures in dissolving the dyestuff form in strong sulfuric acid. The present invention particularizes in specifying the suitable range of strengths for such acid, the minimum quantity of acid for the dyestuff solution, and the temperature for effecting such solution.

Generally, the next step is like the prior art in calling for addition of the acid solution to water. However, the present invention particularizes and distinguishes in the temperature at which such action takes place. It also distinguishes in having, as a new variation in said dilution, the presence of a wetting agent which produces improvement in the pigment form over a like procedure without the wetting agent.

Acid

The dyestuff may be dissolved in strong sulfuric acid varying in strength from 75% by weight in aqueous solution, to 20% fuming sulfuric acid. The exact control of the temperature of solution is not a major factor governing the success of the process, and it may vary over a range. Preferably it is low, without necessarily being specially cooled, to avoid excess heat in the second stage of the process. The amount of acid should be at least 5 times in weight the amount of the dyestuff, and is preferably in the amount of 8 to 11 times the quantity of employed dyestuff. However, for certain of the phthalocyanine dyestuffs whose solubility in sulfuric acid is small, see Example 4, the proportion of acid may be in the neighborhood of over 20 times the amount of dyestuff.

The procedure is to dissolve the dyestuff in the acid, allowing enough time, such as an hour with agitation, to insure complete solution.

Dilution

The acid solution is diluted by adding it to water, also known as drowning, in quantity to effect complete precipitation of the dyestuff. The quantity of water, or ice and water, will vary according to the strength and quantity of the sulfuric acid employed. A sufficient quantity is such as to insure that the diluted acid is below 40% by weight in strength as aqueous sulfuric acid.

The temperature of the dilution mass should be not over 30° C., and preferably it is much lower and near or below 0° C., effected by the use of ice and water to receive the acid solution.

Wetting agent

A wetting agent may be present in the water used to effect dilution of the acid solution. From 2 to 10 parts by weight of wetting agent are preferred, for each 100 parts by weight of dyestuff. Suitable wetting agents are: Turkey red oil, esters of sodium sulfosuccinic acid (such as the dioctyl ester), sulfated fatty alcohols (such as sulfated oleyl alcohol), and octyl alcohol. Turkey red oil is generally preferred because it is relatively the least expensive and produces highly satisfactory results.

The wetting agents, as employed in this process, effect improvements in masstone and tinctorial properties beyond those secured when their use is omitted, whether the precipitated dyestuff is later heated in the solution containing the diluted acid, or heated in water after filtration from the acid solution or after filtration and washing free from acid.

Heating

The precipitated dyestuff is heated in sufficient water to suspend it for free agitation, at least to 50° C., but preferably to boiling. By the term "precipitated dyestuff," as used in reference to this heating step, the presence or absence of some or all of the original acid is contemplated.

With the foregoing elaboration and limitations of the process in mind as giving the range of variables for the invention, the following examples will suffice to illustrate the preferred methods of procedure.

Example 1

10 parts by weight of copper phthalocyanine (see "Journal of the Chemical Society," 1934, pp. 1027 to 1031) are agitated in 110 parts by weight of 98% sulfuric acid, originally at normal room temperature, for one hour. A rise in temperature will be observed. The acid solution is then slowly added to a well agitated mass consisting approximately of:

| | Parts by weight |
|---|---|
| Ice | 100 |
| Water | 100 |
| Turkey red oil | 0.6 |

Approximately 300 additional parts of ice may be added simultaneously, depending in quantity upon the size of the mass, radiation of heat, and like factors—the object being to retain ice as an indication of a more or less constant temperature condition during the addition, all for the sake of uniformity of procedure for repetitive practice. The final temperature will be from −5° to −10° C.

The agitated slurry is then heated to its boiling temperature, and boiled for about 10 minutes. The dyestuff, now in suitable pigment form, is filtered, washed free from acid, and dried. Drying is preferably standardized at 60° to 70° C., merely for uniformity of procedure.

The product has excellent pigmentary properties, having high purity of shade, remarkable tinctorial strength, and a masstone much darker than pigments produced by adding an acid solution of the dyestuff to boiling water.

Example 2

10 parts of copper monochloro-phthalocyanine (see U. S. Patent No. 2,129,013) are processed as in Example 1, with like properties in the product, and also darker in masstone than the product resulting from conditioning by adding an acid solution to boiling water.

Example 3

Example 1 is repeated with these changes: the Turkey red oil is replaced by a light weight of the sodium salt of the dioctyl ester of sulfosuccinic acid. Upon completion of the ice-water dilution, a filtration is made. The filter cake, after a slurrying in 500 parts of water, is then boiled for a 10 minute period. It is then recovered as in Example 1.

The obtained product is of excellent quality and similar in properties to the pigment dyestuff of Example 1.

Example 4

10 parts of a highly chlorinated copper phthalocyanine containing 14 to 16 chlorine atoms per mol (see U. S. Patent No. 2,195,984) are agitated in 220 parts by weight of 98% sulfuric acid, originally at room temperature, for one hour. A very slight rise in temperature will be found to occur.

A dilution and subsequent processing follows in the manner of Example 1, however, with the exception that the 300 parts of ice are increased to an approximate 600 parts more or less, the object being to maintain a temperature in the vicinity of 0° C.

The resulting pigment dyestuff is characterized by excellence of shade and strength, and a masstone that is darker and brighter than the usual pigment of this composition.

Example 5

10 parts of the crude metal-free phthalocyanine (see U. S. Patent 2,116,602) are conditioned in the manner of Example 1. The resulting pigment dyestuff is unusual with respect to darkness and brightness of masstone, clarity of hue, and high tinctorial strength.

Example 6

Example 1 is repeated, omitting wetting agent, with the tinctorial properties being inferior to those obtained in Example 1, yet much superior to those obtained by the prior procedure of adding the acid solution of the dyestuff to boiling water.

With reference to the introductory discussion as to the specificity of steps for particular dyestuffs, it may be stated that the procedure of U. S. Patent No. 2,065,928 pertaining to Indanthrene Blue RS is not universally suitable for the phthalocyanine type of colors. It has also been found, in support of this specificity, that the procedure of the present invention, when applied to Indanthrene Blue RS, is not at all satisfactory.

It is to be understood that the examples serve merely to illustrate the invention and are not in limitation thereof. The process may be carried out in numerous ways without departing from the spirit and scope of the invention as set forth in the appended claims.

I claim:

1. The process of converting a phthalocyanine dyestuff to pigment form which comprises dissolving the dyestuff in concentrated sulfuric acid while using an amount and concentration of acid at least sufficiently great to effect complete solution, drowning the resulting acid solution of the dyestuff in sufficient cold water to precipitate the dyestuff and form a dilute aqueous sulfuric acid solution of below 40% strength while maintaining the temperature of the diluted acid at not over 30° C. throughout the precipitation and dilution step, heating the precipitated dyestuff in the resulting dilute acid medium to a temperature in the range from about 50° C. to the boiling temperature thereof to effect dispersion of the dyestuff, and recovering the dyestuff as pigment.

2. The process of converting a phthalocyanine dyestuff to pigment form which comprises dissolving the dyestuff in concentrated sulfuric acid while using an amount and concentration of acid at least sufficiently great to effect complete solution, drowning the resulting acid solution of the dyestuff in sufficient cold water containing ice to precipitate the dyestuff, the quantity and proportions of water and ice being such as to dilute the acid to a strength of below 40% and to maintain the temperature of the diluted acid at not over 30° C. throughout the precipitation and dilution step, heating the precipitated dyestuff in the resulting dilute acid medium to a temperature in the range from about 50° C. to the boiling temperature thereof to effect dispersion of the dyestuff, and recovering the dyestuff as pigment.

3. The process of converting a phthalocyanine dyestuff to pigment form which comprises dissolving the dyestuff in concentrated sulfuric acid while using an amount and concentration of acid at least sufficiently great to effect complete solution, drowning the resulting acid solution of the dyestuff in sufficient cold water containing ice to precipitate the dyestuff, the quantity and proportions of water and ice being such as to dilute the acid to a strength of below 40% and to maintain the temperature of the diluted acid in the vicinity of 0° C. throughout the precipitation and dilution step, heating the precipitated dyestuff in the resulting dilute acid medium to a temperature in the range from about 50° C. to the boiling temperature thereof to effect dispersion of the dyestuff, and recovering the dyestuff as pigment.

4. The process of converting a phthalocyanine dyestuff to pigment form which comprises dissolving the dyestuff in concentrated sulfuric acid while using an amount and concentration of acid at least sufficiently great to effect complete solution, drowning the resulting acid solution of the dyestuff in sufficient cold water containing ice and a wetting agent to precipitate the dyestuff, the quantity and proportions of water and ice being such as to dilute the acid to a strength of below 40% and to maintain the temperature of the diluted acid at not over 30° C. throughout the precipitation and dilution step, heating the precipitated dyestuff in the resulting dilute acid medium to a temperature in the range from about 50° C. to the boiling temperature thereof to effect dispersion of the dyestuff, and recovering the dyestuff as pigment.

5. The process of converting a phthalocyanine dyestuff to pigment form which comprises dissolving the dyestuff in concentrated sulfuric acid while using an amount and concentration of acid at least sufficiently great to effect complete solution, drowning the resulting acid solution of the dyestuff in sufficient cold water containing ice and a wetting agent to precipitate the dyestuff, the quantity and proportions of water and ice being such as to dilute the acid to a strength of below 40% and to maintain the temperature of the diluted acid in the vicinity of 0° C. throughout the precipitation and dilution step, heating the precipitated dyestuff in the resulting dilute acid medium to a temperature in the range from about 50° C. to the boiling temperature thereof to effect dispersion of the dyestuff, and recovering the dyestuff as pigment.

6. The process of converting a copper phthalocyanine dyestuff to pigment form which comprises dissolving the dyestuff in concentrated sulfuric acid while using an amount and concentration of acid at least sufficiently great to effect complete solution, drowning the resulting acid solution of the dyestuff in sufficient cold water to precipitate the dyestuff and form a dilute aqueous sulfuric acid solution of below 40% strength while maintaining the temperature of the diluted acid at not over 30° C. throughout the precipitation and dilution step, heating the precipitated dyestuff in the resulting dilute acid medium to a temperature in the range from about 50° C. to the boiling temperature thereof to effect dispersion of the dyestuff, and recovering the dyestuff as pigment.

7. The process of converting a copper phthalocyanine dyestuff to pigment form which comprises dissolving the dyestuff in concentrated sulfuric acid while using an amount and concentration of acid at least sufficiently great to effect complete solution, drowning the resulting acid solution of the dyestuff in sufficient cold water containing ice and a wetting agent to precipitate the dyestuff, the quantity and proportions of water and ice being such as to dilute the acid to a strength of below 40% and to maintain the temperature of the diluted acid at not over 30° C. throughout the precipitation and dilution step, heating the precipitated dyestuff in the resulting dilute acid medium to a temperature in the range from about 50° C. to the boiling temperature thereof to effect dispersion of the dyestuff, and recovering the dyestuff as pigment.

8. The process of converting a copper phthalocyanine dyestuff to pigment form which comprises dissolving the dyestuff in concentrated sulfuric acid while using an amount and concentration of acid at least sufficiently great to effect complete solution, drowning the resulting acid solution of the dyestuff in sufficient cold water containing ice and a wetting agent to precipitate the dyestuff, the quantity and proportions of water and ice being such as to dilute the acid to a strength of below 40% and to maintain the temperature of the diluted acid in the vicinity of 0° C. throughout the precipitation and dilution step, heating the precipitated dyestuff in the resulting dilute acid medium to a temperature in the range from about 50° C. to the boiling temperature thereof to effect dispersion of the dyestuff, and recovering the dyestuff as pigment.

9. The process of converting a phthalocyanine dyestuff to pigment form which comprises dissolving the dyestuff in strong sulfuric acid having a strength in the range from that of 75% by weight of sulfuric acid in aqueous solution to that of 20% fuming sulfuric acid, while using at least 5 parts by weight of said strong acid to 1 part by weight of said dyestuff and while using an amount and concentration of acid at least sufficiently great to effect complete solution, drowning the resulting acid solution of the dyestuff in sufficient cold water to precipitate the dyestuff and form a dilute aqueous sulfuric acid solution of below 40% strength while maintaining the temperature of the diluted acid at not over 30° C. throughout the precipitation and dilution step, heating the precipitated dyestuff in the resulting dilute acid medium to a temperature in the range from about 50° C. to the boiling temperature thereof to effect dispersion of the dyestuff, and recovering the dyestuff as pigment.

GRADY M. O'NEAL.